UNITED STATES PATENT OFFICE.

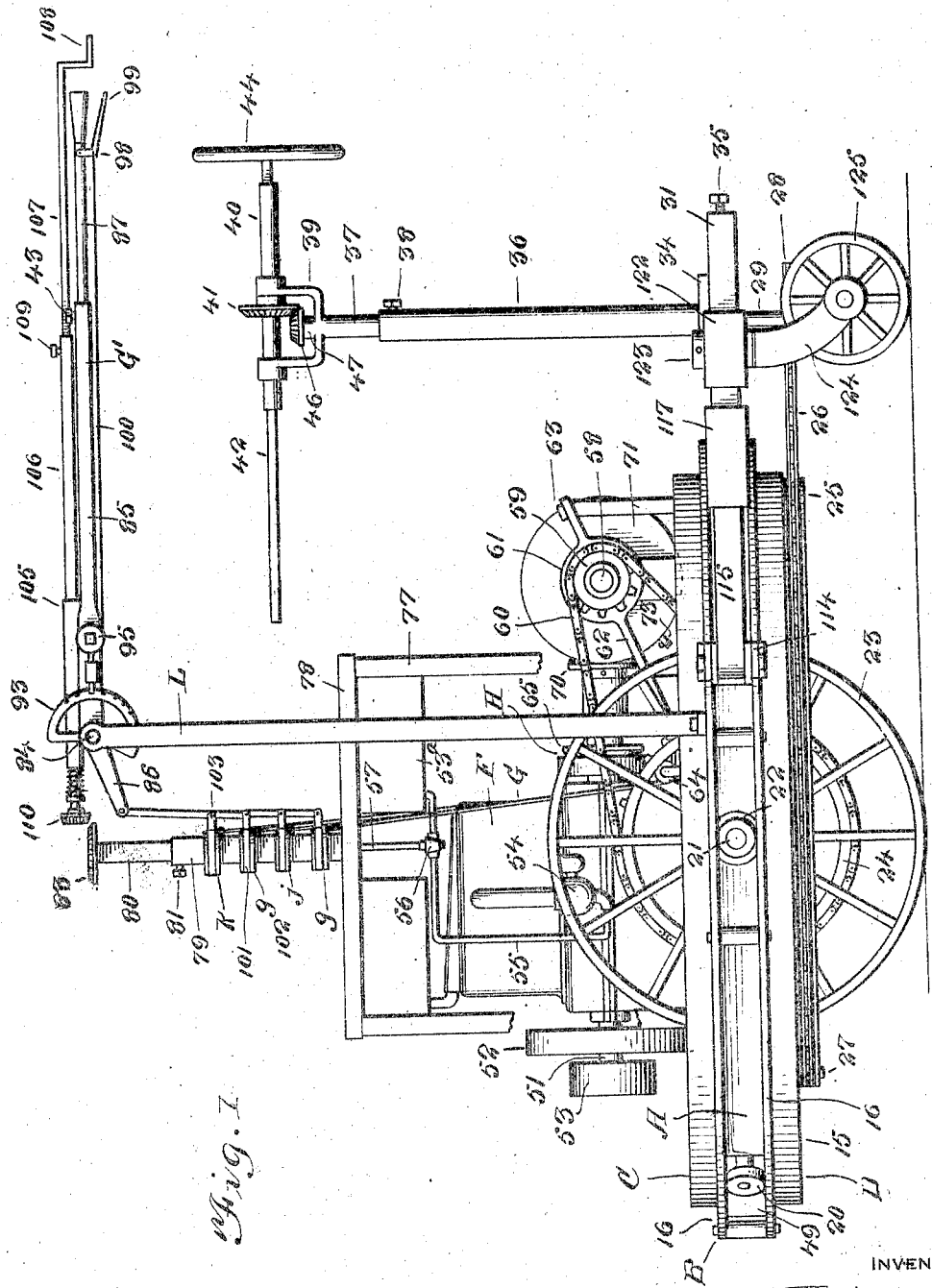

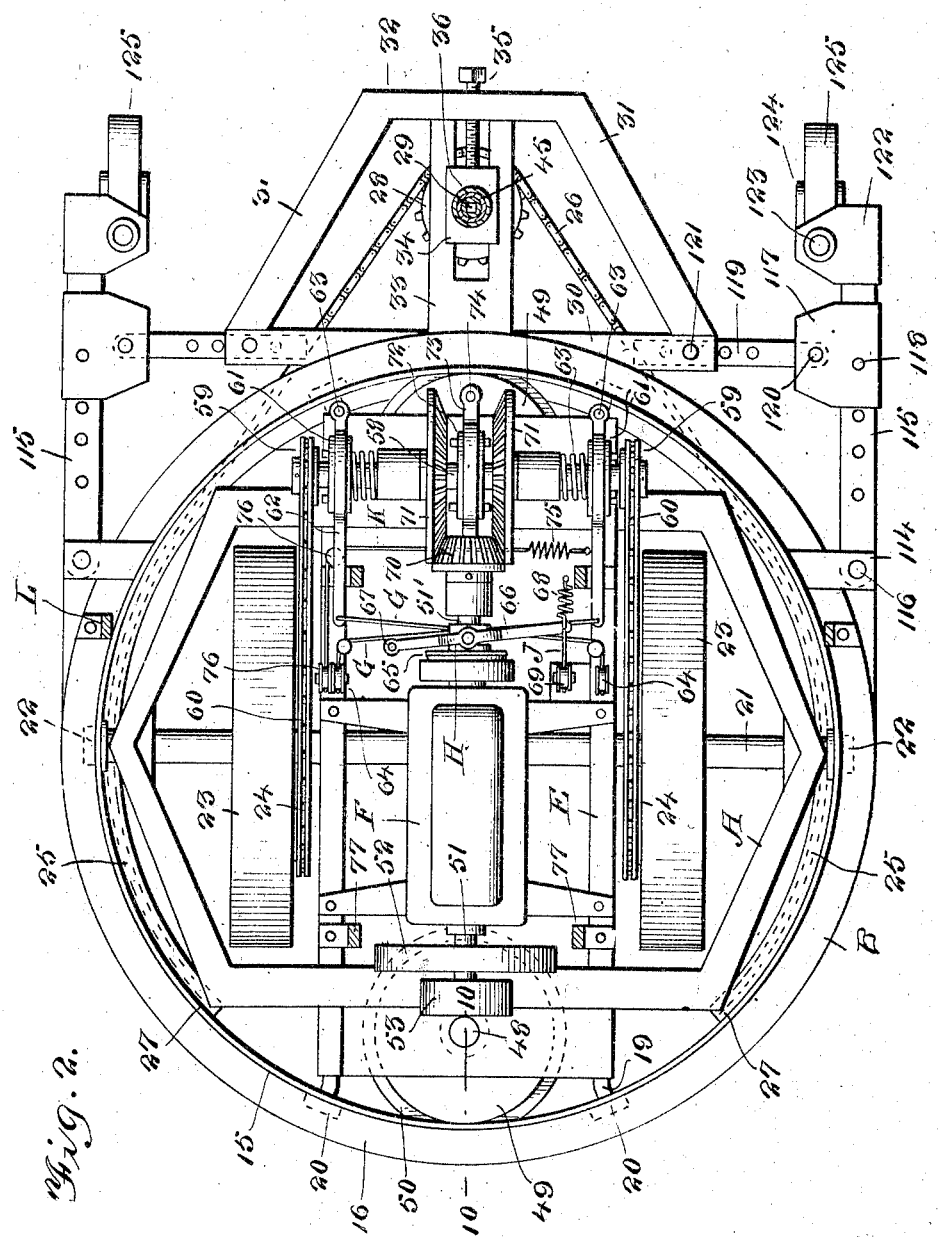

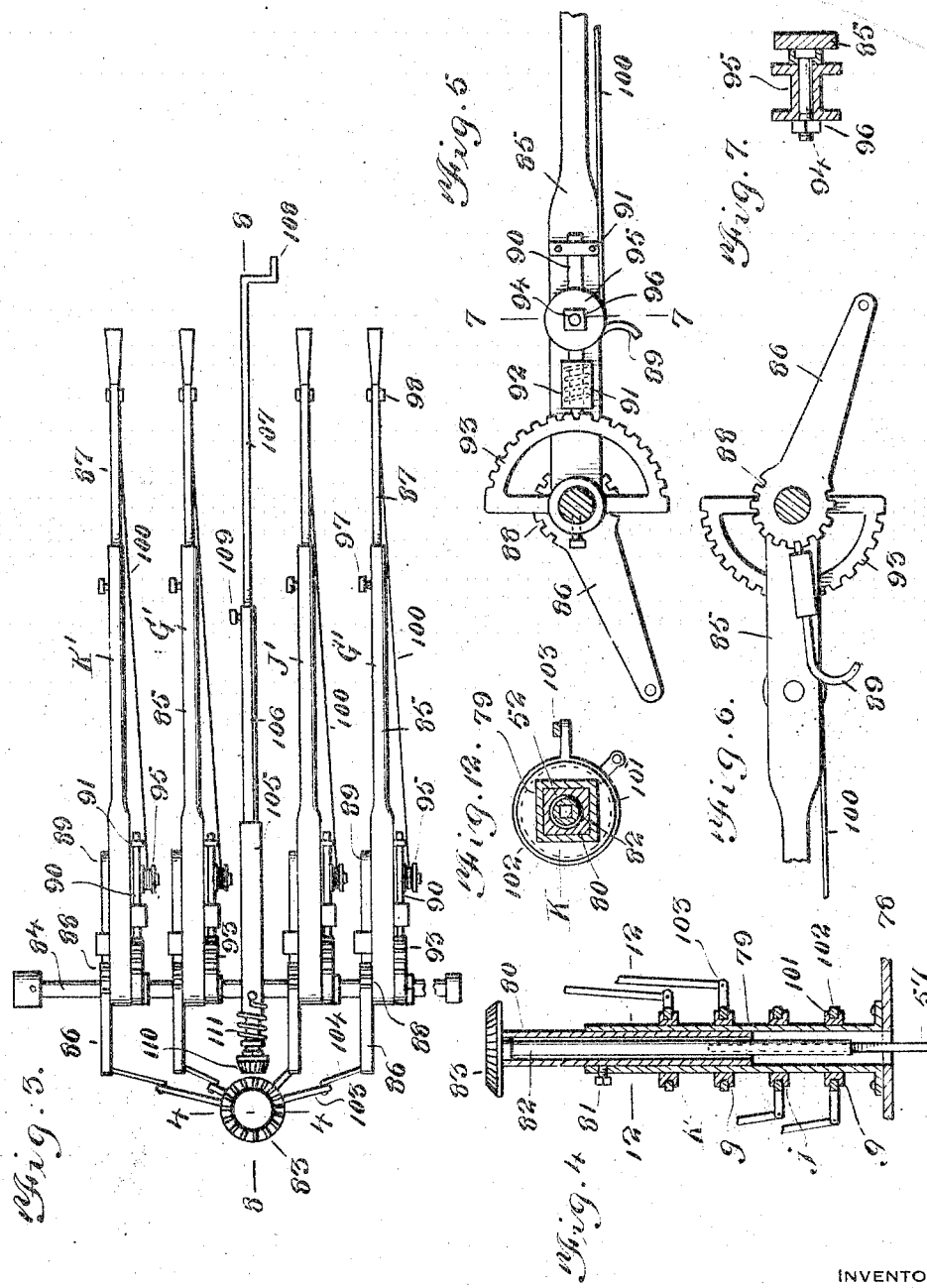

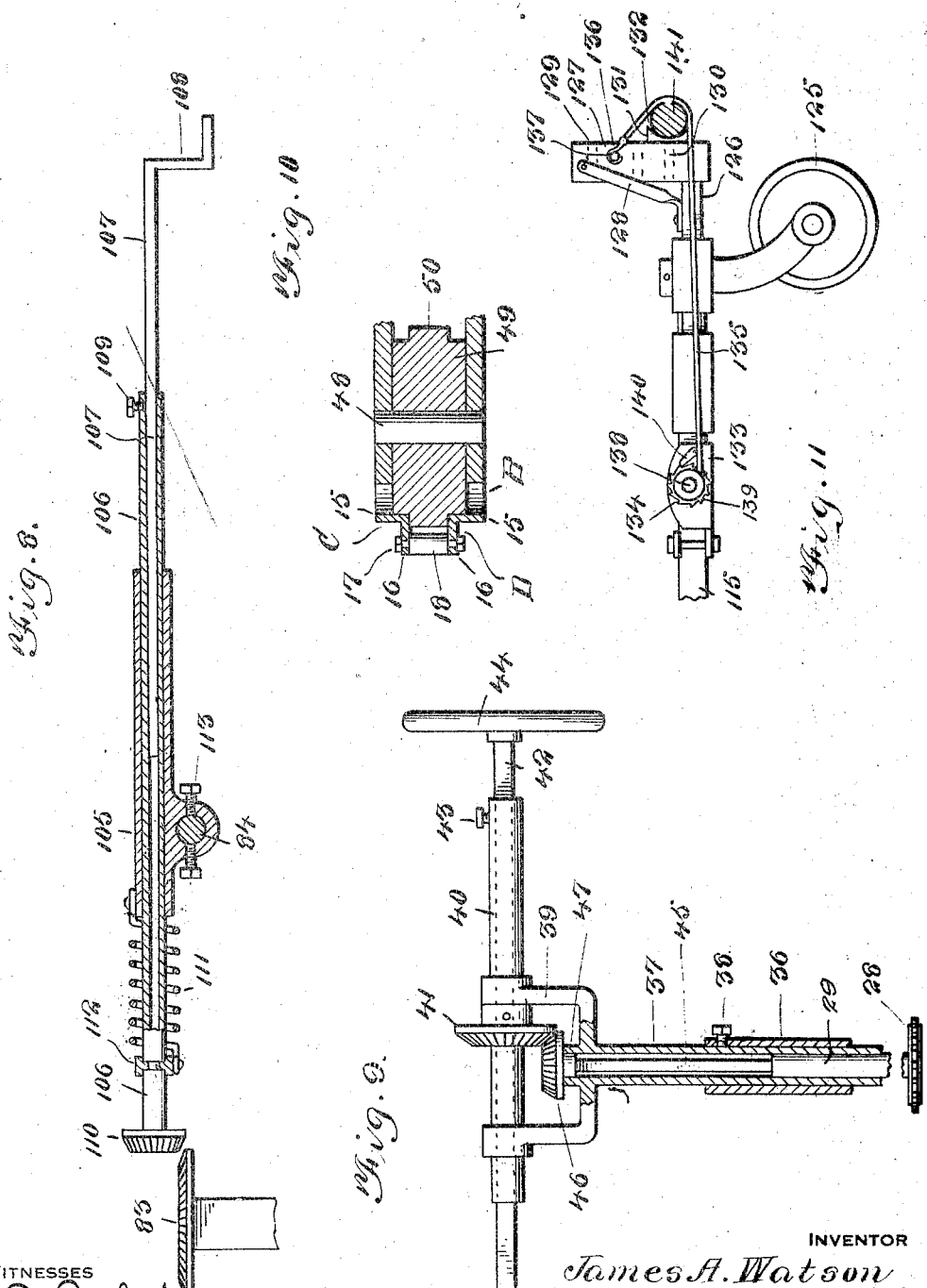

JAMES A. WATSON, OF MARION, INDIANA.

TRACTION-ENGINE.

1,307,944. Specification of Letters Patent. Patented June 24, 1919.

Application filed December 14, 1917. Serial No. 207,167.

*To all whom it may concern:*

Be it known that I, JAMES A. WATSON, a citizen of the United States, residing at Marion, in the county of Grant and State of Indiana, have invented new and useful Improvements in Traction-Engines, of which the following is a specification.

This invention relates to traction engines and it has for its object to produce a machine of this class which will be particularly adapted for general farm use, for operating agricultural implements of various kinds, such as plows, cultivators, harvesting machines and the like, for drawing farm wagons, and which may be also utilized as a stationary engine for operating pumps, wood sawing machines, threshing machines and the like.

A further object of the invention is to produce a machine of this class having simple and improved steering mechanism whereby it may be absolutely controlled when in motion and which will enable sharp turns to be made when required.

A further object of the invention is to simplify and improve the steering mechanism as well as the means for controlling the driving means and the transmission of motion.

With these and other ends in view which will appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a view in side elevation of a tractor constructed in accordance with the invention.

Fig. 2 is a top plan view, certain parts having been removed for the purpose of more clearly illustrating the subjacent parts.

Fig. 3 is a plan view of the controlling levers and related parts.

Fig. 4 is a sectional detail view taken on the line 4—4 in Fig. 3.

Fig. 5 is a detail view in side elevation showing a portion of one of the controlling levers.

Fig. 6 is a side view showing the opposite side to that seen in Fig. 5.

Fig. 7 is a sectional detail view taken on the line 7—7 in Fig. 5.

Fig. 8 is a sectional detail view taken on the line 8—8 in Fig. 3.

Fig. 9 is a detail view partly in elevation and partly in vertical section of a portion of the steering gear.

Fig. 10 is a sectional detail view taken on the line 10—10 in Fig. 2.

Fig. 11 is a detail view in side elevation of a hitching device which may be used in connection with the invention.

Fig. 12 is a sectional detail view taken on the line 12—12 in Fig. 4.

Corresponding parts in the several figures are denoted by like characters of reference.

The frame structure of the improved machine comprises what may be regarded as two distinct and separate frames, namely the inner or main frame which is designated generally by A and the outer or circular frame designated by B, said circular frame being however, equipped with certain rearwardly extending frame portions which will be hereinafter more particularly described.

The circular frame B is composed as will be best seen in Figs. 1 and 10, of upper and lower members of angular shape in cross section each of said members comprising a substantially vertical wall portion 15 and a horizontally disposed flange 16, said flange being disposed at the lower end of the vertical wall portion of the upper member and the upper edge of the vertical wall portion of the lower member. The upper and lower members which are specifically designated by C and D respectively, are connected together by bolts 17 extending through the horizontal flanges 16 and spaced apart by spacing sleeves 18 that are mounted on the respective bolts intermediate the flanges 16. Said connecting and spacing members are disposed adjacent to the outer edges of the horizontal flanges 16 so as not to interfere with the arrangement and operation of other devices which are to be hereafter described.

The main frame A has been shown as being of elongated hexagonal shape, the parts being so constructed and proportioned that the corners of said frame will lie closely adjacent to the vertical wall portions 15 of the circular frame. Included in the main frame A is an elongated rectangular supporting frame E provided at the corners thereof with brackets 19 carrying anti-frictional rollers 20 which operate between the horizontal flanges of the upper and lower members of the circular frame. The axle 21 lies substantially in the plane of the elongated rectangular frame E, the side members of which may be equipped with bearings for said axle, and the latter being provided at the ends thereof with anti-friction rollers 22 operating between the horizontal flanges 16 of the upper and lower members C and D of the circular frame. The axle is equipped with ground wheels 23 which are loosely mounted for rotation on the axle, each of said ground wheels having associated therewith a sprocket wheel 24. A portion of the elongated hexagonal main frame A extends beneath the circular frame and connected with said downwardly extending portion at the corners thereof is an arcuate channel member or guide 25 in which the steering chain 26 is guided. The arcuate channel or guide member extends through an arc of approximately 279 degrees, extending around what may be regarded as the forward portion and the sides of the main frame. The ends of the steering chain are made fast to the channel or guide at the points indicated by 27 near the respective ends of the channel, and said steering chain is trained over a sprocket wheel 28 which is fixed at the lower end of the steering rod or shaft 29. The manner of constructing and supporting the steering rod or shaft will be presently described.

Securely connected with the circular frame B at the rearward portion thereof is a transversely disposed frame bar 30 which is preferably of square tubular cross section and from the ends of which convergent frame bars 31 extend in a rearward direction, said rearwardly convergent frame bars being connected together by a bridge piece 32 which latter in turn is connected with the frame bar 30 by a longitudinally disposed frame bar 33. The frame bar 33 supports a slide 34 which may be longitudinally adjusted by an adjusting screw 35. Mounted on the slide 34 and extending upwardly therefrom is a tubular casing 36 in which telescopes a tube 37 which latter may be retained in adjusted position by a set screw 38. The tube 37 is provided at its upper end with a fork 39 the limbs of which afford bearings for a horizontally disposed tubular shaft 40 on which a beveled gear 41 is fixed between the limbs of the fork. Telescoping in the tubular shaft 40, and extending entirely therethrough, is a steering rod 42, the same being capable of being secured in position at various adjustments by a set screw 43, said steering rod or shaft being also provided at its rearward end with a hand wheel or steering wheel 44. Telescoping in the tubular shaft 37 is the tubular shaft 29 having a bore of square cross section as will be best seen in Fig. 2, said shaft carrying at its lower end, which extends through the slide 34, the sprocket wheel 28. Telescoping in the shaft 29 is a shaft 45 which is of square cross section and which carries at its upper end a beveled gear 46 meshing with the beveled gear 41, said beveled gear 46 being stepped or supported on a bushing 47 formed on the bridge piece of the fork 39.

It will be observed that by manipulating the hand wheel 44 the sprocket wheel 28 will be rotated about its axis, thereby rotating the inner or main frame A in a horizontal plane for the purpose of steering the machine in the desired direction.

The rectangular frame E which forms a part of the main frame A is provided with bearings adjacent to the front and rear ends thereof for shafts, one of which is indicated at 48 in Fig. 2, said shafts carrying contact wheels 49, each consisting of a disk, the perimeter of which abuts on the vertical wall portions 15 of the upper and lower members C, D of the circular frame, each of said contact wheels having a circumferential flange 50 that extends between the horizontal flanges 16 of said top and bottom members between which the said flange 50 is guided. It will be seen that no matter what may be the position of the main frame A relatively to the circular frame B, the contact wheels will abut on the wall portions 15 of said circular frame, which latter will thus be pushed and compelled to move in the direction in which the main frame is driven.

The main frame A supports an engine or motor generally designated by F which may be any desired type of internal combustion engine. The motor has been shown as being equipped with a main shaft 51 carrying a balance wheel 52 and a pulley 53 which may be used for transmission of power by means of an ordinary belt when the machine is used as a stationary engine. The motor is provided with the usual appurtenances including the gasolene tank 53ª which is connected with the carbureter 54 by a pipe 55 having a valve, the casing of which is shown at 56 for controlling the flow of gasolene, said valve being operated by a stem 57 for the rotation of which special means to be hereinafter described, are provided. 58 designates a countershaft carrying loose sprocket wheels 59 the same being connected by chains 60 with the sprocket wheels 24 on the ground wheels or traction wheels 23 which, as previously described, are loosely mounted on the axle 21. For the purpose of operatively connecting the sprocket wheels 59 with the countershaft 58 for rotation therewith, in order that rotary motion may be imparted to the traction wheels, clutches 61 are provided, said clutches being keyed on the countershaft for rotation therewith and for slidable movement with respect thereto so that the said clutches may be moved in and out of engagement with the respective sprocket wheels by means of shipping levers 62 fulcrumed at 63, said clutch members 61 being normally forced in the direction of the respective sprocket wheels 59 by the action of springs 63 coiled about the countershaft. The shipping levers 62 may be moved to force the respective clutch members against the tension of the springs 63 and out of engagement with the respective sprocket wheels 59 by means of cables G, said cables being guided over suitably arranged guide means, such as pulleys 64 to surround movably supported operating or actuating members which will be hereinafter fully described.

For the purpose of transmitting motion from the engine to the countershaft 58 means are provided including a friction clutch H the slidable member of which 65, is actuated by a shipping lever 66, fulcrumed at 67 and which is actuated by a spring 68 whereby the slidable member of the clutch is normally held out of engagement with its mate. The shipping lever 66 may be moved against the tension of the spring 68 so as to place the slidable clutch member in active engagement with its mate by means of a cable J which is guided over suitably arranged pulleys 69 to a movably supported operating member which will be presently described. The portion 51' of the motor shaft which is driven by the friction clutch H carries a pinion 70 which meshes with two opposed beveled gears 71 which are loosely mounted on the countershaft, but either one of which may be locked on the countershaft for rotation therewith by means of a double clutch 72 which is keyed on the countershaft intermediate the beveled gears 71 so that it may occupy a neutral position intermediate the said beveled gears, or it may be moved into engagement with either one of the beveled gears by means of a shipping lever 73 fulcrumed at 74. A spring 75 is provided whereby the shipping lever 73 is actuated so as to normally force the clutch member 72 in the direction of one of the beveled gears 71. The shipping lever however, may be actuated so as to sustain the clutch member 72 in a neutral position and to move it in engagement with the other beveled gear 71 by means of a cable K guided over suitably arranged guide pulleys 76 to a movably supported operating and actuating member which will be presently described.

The engine and its appurtenances are surrounded and protected by a frame structure including vertically disposed uprights 77 and horizontal frame bars 78. Rising from said frame structure is a tubular post 79 of square cross section. Mounted on said post for slidable movement thereon are four collars designated respectively by $g$, $j$, $g$ and $k$ reading from the bottom upward, said collars having the cables G, J, G and K connected therewith in the order named. It will be evident by moving the respective collars upwardly on the post 79, the shipping levers with which the respective cables are connected will be operated against the tension of the respective springs. Means are provided whereby the movement of the respective collars may be governed, thereby placing the operator in full control of the friction clutch whereby the machine is started and stopped, the clutches controlling the operation of the traction wheels, and the clutch controlling the reversing gear. Telescoping in the tubular post 79 is a tube 80 having a circular bore, said tube 80 being capable of being retained at various adjustments by a set screw 81. Telescoping in the tube 80 is a tube 82 having a square or non-circular bore and telescoping in the last mentioned tube is the valve stem 57 which actuates the controlling valve in the casing 56. The tube 82 carries at its upper end a beveled gear 83 which is normally supported on the upper end of the tube 80. L designates a lever stand rising from the circular frame B. The lever stand supports at its upper end a shaft 84 on which four levers G', J', G' and K' are supported for rocking movement, said levers being of similar but special construction which is best illustrated in Figs. 3, 5 and 6 and which will now be described.

Each of said levers includes a long arm 85 and a short arm 86, said long and short arms being independently fulcrumed on the shaft 84 and said long arm being provided with a telescoping extension 87. The short arm 86 has a head forming a toothed segment 88, the same being engaged by a spring actuated dog 89 carried by the long arm 85, thereby enabling the long and short arms to be adjusted and retained at various angular positions with relation to each other. Supported on the long arm 85 is a slidable dog 90, the same being mounted in keepers 91 one of which contains a spring 92 whereby the dog 90 is normally moved in engagement with a segment rack 93 which is fixed on and supported by the shaft 84. The sliding dog 90 carries a spindle 94 on which is mounted a revoluble spool 95, the spindle being provided with a nut 96 whereby the spool may be secured against rotation. The telescopic extension 87, for the retention of which at various adjustments, a set screw 97 is provided, carries a short pivoted arm 98 having a handle 99 whereby it may be manipulated, said arm 98 being connected with the spool 95 by a flexible element such as a cord 100. When the extension member 87 is adjusted for the purpose of varying the effective length of the lever arm 85, the nut 96 is loosened and the spool 95 is rotated for the purpose of letting out the cord 100 or taking up slack in said cord as may be required, the nut 96 being tightened for the purpose of firmly securing the spool when the cord has been drawn taut, proper allowance being made however, for permitting the spring actuated slide or dog 90 to remain in engagement with the rack segment 93. The lever composed of the arms 85 and 86 will thus be retained in position, but by pressing the handle 99 of the arm 98 the slide may be disengaged from the segment rack, thereby permitting the lever to be adjusted about the axis of the shaft 84.

Each of the slidable collars $g$, $j$, $g$ and $k$ is provided with a circumferential groove 101 occupied by a loosely fitting band 102 having a radially extending arm 103 with which is connected one end of a link 104 the other end of which is pivotally connected with the short arm 86 to one of the respective levers G', J', G' and K'. It follows that by rocking any one of said levers about the axis of the shaft 84 the corresponding collar on the post 79 may be lifted so as to actuate the shipping lever connected therewith. The transmission and reversing gear of the machine will thus be under control of the operator by proper adjustment of the several levers. It will also be seen that when it shall be desired, a proper adjustment of the levers, to suit the length of the connecting cables and for any other purposes may be effected by relative adjustment of the long and short arms of said levers. It will furthermore be seen that when the inner frame is turned by operation of the steering gearing, the collars carried on the square tubular post will turn with said post, thereby maintaining the connecting cable in proper relation with respect to said collars and to the shipping levers. The tubular post 79 rises on the line of the axis about which the main frame A is turned by the steering gear, and hence the proper position will be maintained between said post and the operating levers.

Supported on the shaft 84 and fixedly connected therewith is a tubular member 105, best seen in Fig. 8 in which a second tube 106 is revolubly mounted, said second tube having a square bore in which telescopes a rod 107 having a terminal crank 108, said rod being capable of being secured at various adjustments by a set screw 109. The tube 106 carries a beveled gear 110 which is capable of meshing with the beveled gear 83 whereby the valve stem 57 may be rotated, the tube 106 being capable of being rotated by the crank rod 107. Normally however, the beveled gear 110 is retracted with respect to the beveled gear 83 by means of a spring 111 connected at one end with the tubular member 105 and at the other end with a collar 112 which is revolubly mounted on the tube 106. By pushing the crank rod 107 in a forward direction the beveled gears 110 and 83 may be placed in mesh and the rod 107 may now be turned by the crank 108 to effect desired adjustment of the valve rod for the purpose of controlling the flow of gasolene. When the desired adjustment has been made the crank rod is released and the retracting spring will now serve to place the beveled gears out of mesh. When the tube 80 telescoping in the tubular post 79 is raised or lowered, a corresponding adjustment of the tubular member 105 may be effected by temporarily releasing the set screws 113 whereby it is fixed on the shaft 84 after which the tubular member may be tilted to the proper position and again made fast on the shaft 84 by tightening the set screws 113.

The circular frame B is provided with laterally extending arms 114 with which rearwardly extending frame bars 115 are pivotally connected by pivot members 116. Each of the side bars 115 is provided with a slide 117 adjustable thereon by a pin 118, said slide having an arm 119 and pivotally connected therewith by a pivot member 120. The arms 119 are adapted to telescope in the tubular frame bar 30 with which said arms are adjustably connected by pins 121, it being obvious that a plurality of apertures are provided for engagement with the respective pins 118 and 121. By temporarily removing the pins 118 and 121 the arms 119 may be variously adjusted in the tubular frame bar 30 thereby varying the distance between the rearward ends of the side frame bars 115 which latter, together with the arms 119, are capable of rocking on the pivot members 116 and 120 to permit the desired adjustment to be made. After completing such adjustment the parts may be reassembled by proper replacement of the pins 118 and 121. Mounted on the frame bars 115 adjacent to the rearward ends thereof are supporting members 122 in which are journaled vertically disposed shanks 123 each having a fork 124 in which a caster wheel 125 is journaled, said caster wheels constituting trailers which normally serve to support the rearward end of the frame structure of the machine and to facilitate the turning of the machine.

The frame bars 115 are preferably of square tubular construction, this being to facilitate the use of a hitching device which has been particularly illustrated in Fig. 11. This hitching device includes an arm 126 insertible in the frame bar 115 and carrying an upright 127 held securely by a brace 128, said upright being provided with several apertures 129 for the reception of a shank 130 carrying a block 131 having a recess 132 in the face thereof. The hitching device also includes a supporting member 133 mounted on the frame bar 115 and carrying a drum or spool 134 with which is connected one end of a flexible connecting member such as a chain or cable 135 the other end of which carries a hook 136 adapted to be engaged with a retaining member 137 on the upright 127. The drum or spool 134 which is journaled on a pin or spindle 138 is provided with a ratchet wheel 139 engaged by a dog or pawl 140. When the tractor is to be connected with a wagon or with a machine of any kind, the axle of such wagon indicated at 141 or suitable fixed parts of the machine may be seated in the recesses 132 of the respective blocks 141 after which the cable 135 may be brought around such axle or the like, the hook 136 being made fast to the connecting member 137. The drum 134 may now be rotated until the cable has been drawn tight or taut, thereby completing the connection, reverse rotation of the drum being prevented by the dog 140 engaging the ratchet wheel 139.

When the tractor is hitched to a wagon or other vehicle or agricultural machine, the caster wheels or trailers 125 and the related parts may be detached, the rearward end of the tractor being supported by the carrying wheels of the wagon or machine with which the tractor is connected. It will also be stated that it may be found desirable to provide a hitch of special construction to be used when the tractor is to be hitched to a binder. Such special hitching device it is not considered necessary, however, to describe herein.

From the foregoing description, taken in connection with the drawings hereto annexed, the operation and advantages of the improved traction engine will be readily understood. The construction will be found simple and inexpensive and of such a nature that the machine may be readily handled by one operator. It will be particularly noted that special provision has been made for the longitudinal and vertical adjustment of those parts of the controlling devices which require to be manually actuated by the operator so as to bring such parts within the convenient reach of the operator whose station will obviously be changed in accordance with the nature of the wagon, machine or implement to be drawn by the tractor, while still other adjustments may be made to suit the position of the operator when the tractor is driven by itself. The tractor may be easily and completely reversed and driven forward or backward as may be required. The tractor also readily adapts itself to the turning of sharp corners, such turning being facilitated by interrupting the rotation of the right or left traction wheel according to the direction in which the turn is to be made. The major part of the frame structure is preferably made of tubular steel or iron but it is obvious that no limitation is made or intended in this respect.

I claim:—

1. In a traction engine, a wheel supported main frame and means for driving the same, said main frame having supporting members arranged in an approximately horizontal plane, a circular frame comprising upper and lower members of angular cross section suitably connected and spaced apart, said upper and lower members receiving supporting members between them and contact wheels supported by the main frame and constantly contacting with the vertical wall portions of the angular top and bottom members of the circular frame, said contact wheels having circumferential flanges received between the horizontal flanges of the angular top and bottom members of the circular frame.

2. In a traction engine, a circular frame having angular top and bottom members connected and spaced apart, a wheel supported main frame arranged within the circular frame and supporting the same, means carried by the circular frame whereby the main frame may be rotated within the same about an approximately vertical axis and rotary contact means carried at the front and rear ends of the main frame, said rotary contact means having circumferential flanges received between the upper and lower members of the circular frame and said contact members being arranged to constantly abut upon diametrically opposed portions of the circular frame.

3. In a traction engine, a wheel supported main frame, a circular frame surrounding the main frame and carried thereby, means whereby the main frame may be axially rotated within the circular frame, a motor carried by the main frame and having a driven shaft, a countershaft having clutch controlled gearing for transmitting motion to the traction wheels supporting the main frame and a clutch controlled reversing gear, means including a friction clutch for transmitting motion from the motor shaft to the countershaft, shipping levers for actuating the traction clutch and clutches controlling the reversing gear and the means for transmitting motion to the traction wheels, springs whereby each of said shipping levers will be actuated in one direction and means for actuating each of said shipping levers against its actuating spring, said means including a post rising from the main frame, collars fitted for slidable movement on said post, suitably guided flexible connecting means between said collars and the respective clutch levers, and means for moving the collars and for controlling the movement and adjustment thereof.

4. In a traction engine, a wheel supported main frame, a circular frame carried by the main frame and within which said main frame is axially revoluble, contact wheels carried by the main frame and contacting with diametrically opposite portions of the circular frame, means for independently driving the traction wheels on which the main frame is supported, for interrupting such movement, for reversing the direction of rotation and for transmitting motion from a source of power to said reversing and transmission means, said means including a plurality of clutches and spring actuated shipping levers for actuating the same, a square tubular post rising from the main frame and disposed axially with relation to the main circular frames, collars slidable on said post, suitably guided flexible connections between said collars and the respective shipping levers, frame members connected with the circular frame, a lever stand rising from said frame members, a shaft carried by the lever stand, levers fulcrumed on said shaft and having long and short arms, bands revolubly connected with the slidable collars and having radial arms, links connecting said radial arms with the short arms of the levers, and means for securing the levers at various adjustments.

5. In a traction engine of the class described, a steering gear including a steering chain, a sprocket wheel over which said chain is trained, a vertically disposed revoluble member carrying said sprocket wheel, telescoping extension members, one of which carries a beveled gear and another of which carries a fork, a tubular member revoluble in the fork and carrying a beveled gear meshing with the first-mentioned beveled gear, an extension member slidable in the tubular member and having a hand wheel, and means for securing the telescoping members in position at various adjustments; in combination with an adjustably supported slide carrying the revoluble member on which the sprocket wheel is secured, and means for adjusting the slide to tighten the steering chain.

6. In a traction engine, the combination of a main frame having a plurality of vertically-disposed anti-friction members arranged in a horizontal plane, wheels supporting said main frame, means for propelling the main frame, and a circular frame comprising upper and lower spaced members between which the vertical anti-friction members of the main frame are received and guided, and horizontal contact wheels carried by the main frame and constantly abutting on the inner surfaces of the circular frame members and having circumferential flanges extending between said members.

In testimony whereof I affix my signature.

JAMES A. WATSON.